United States Patent [19]

Dworak et al.

[11] Patent Number: 4,522,415
[45] Date of Patent: Jun. 11, 1985

[54] PISTON RING FOR AN INTERNAL COMBUSTION ENGINE

[75] Inventors: Ulf Dworak, Baltmannsweiler; Hans Olapinski, Aichwald; Dieter Fingerle, Hochdorf; Ulrich Krohn, Leonberg, all of Fed. Rep. of Germany

[73] Assignee: Feldmühle Aktiengesellschaft, Düsseldorf, Fed. Rep. of Germany

[21] Appl. No.: 571,478

[22] Filed: Jan. 17, 1984

[30] Foreign Application Priority Data

Jan. 21, 1983 [DE] Fed. Rep. of Germany ....... 3301913

[51] Int. Cl.³ .............................................. F16J 9/20
[52] U.S. Cl. ................................... 277/216; 277/224; 277/DIG. 6
[58] Field of Search ....................... 277/170, 96.2, 968, 277/216

[56] References Cited

U.S. PATENT DOCUMENTS 3,727,927  4/1973  Packard .............................. 277/170

FOREIGN PATENT DOCUMENTS

| 814683 | 9/1951 | Fed. Rep. of Germany . |
| 1919666 | 10/1970 | Fed. Rep. of Germany ..... 277/96.2 |
| 2846122 | 5/1979 | Fed. Rep. of Germany . |
| 148657 | 12/1978 | Japan ................................. 277/96.2 |

OTHER PUBLICATIONS

SAE Technical Paper Series, 820505 Wacker, et al.
SAE Technical Paper Series, 820429, Woods, et al.

*Primary Examiner*—Robert I. Smith
*Attorney, Agent, or Firm*—Toren, McGeady, Stanger

[57] ABSTRACT

A piston ring (1) made of ceramic materials for an internal combustion engine comprising a body made by sintering of partially stabilized zirconium oxide (PSZ) which has a porosity <3% and, rolling surface (4) of the piston ring having a centerline average roughness $R_a$ of 0.03 to 0.1 μm. Due to its homogeneous structure, the inventive piston ring avoids the problems of the ceramic/metal bond of known piston rings and, even under high thermal load, does not suffer from thermally induced destruction or welding of the piston ring groove.

7 Claims, 2 Drawing Figures (A–B)

(A-B)

PISTON RING FOR AN INTERNAL COMBUSTION ENGINE

BACKGROUND OF THE INVENTION

1. Field of the Invention

The present invention relates to a piston ring made with a ceramic material for an internal combustion engine.

2. Description of the Prior Art

Piston rings consisting of cast iron or steel material which are often chromium-plated or have a hard metal coating, e.g., of molybdenum, on their rolling surfaces are known. German Offenlegungsschrift No. 14 26 120 discloses molybdenum or tantalum for use in rolling track coating of piston rings. This Offenlegungsschrift also discloses a piston ring coating of high hardness metal compounds, e.g., carbides, oxides, nitrides, borides, silicides and others. German Offenlegungsschrift No. 19 50 081 discloses grooves cut on the outer wall of an oil scraper ring, into which metal oxides or metal carbides are introduced by spray deposition or metallization. Other proposals, such as, in DE-AS No. 26 20 104, DE-OS Nos. 29 26 879, 29 34 027, 29 38 151, 29 42 037, 30 17 907 and 31 02 221, provide for metal carbide coatings or coatings of metal/metal carbide-mixtures, which are applied on the rolling surfaces of piston rings, e.g., by means of plasma jet application.

These suggestions all have a common disadvantage which resides in the problems inherent in the ceramic/metal bond, namely, that materials of different thermal expansion have a different degree of expansion under thermal stress and, as a result, there is the risk that the applied layers may chip off. This danger exists especially for piston rings which are coated with poorly conducting materials. Such piston rings cannot remove the heat generated in the combustion process to the cylinder walls. Additionally, piston rings coated only on their rolling surface may form a phenomenon similar to welding in the piston ring groove between the material of the piston and the metal of the piston ring due to the great heat and thus impair the mobility of the piston ring. Another disadvantage of the coated piston rings lies in the complicated design of the layers and of the manufacturing processes required to make such rings. The relatively high degrees of porosity required, i.e., a porosity up to 20%, in DE-OS 29 42 037, and up to 30% in DE-OS 29 38 151, is also disadvantageous. These porous layers have relatively low strengths and are subject to high wear.

SUMMARY OF THE INVENTION

We have discovered a piston ring which, due to its homogeneous constitution, avoids the above-mentioned problems of the prior art piston rings and, in particular, of the ceramic/metal bond. Furthermore, the inventive piston rings do not exhibit thermally induced destruction phenomena nor welding up in the piston ring groove at high temperatures. At the same time, the inventive piston ring possesses a high mechanical wear strength to cylinder liners of any material and an increased life-span as compared with the known piston rings.

More particularly, the piston ring of the present invention comprises a body formed by sintering partially stabilized zirconium oxide (PSZ) and has a porosity of <3 percent, wherein the rolling surface of the piston ring has a centerline average roughness $R_a$ of 0.03 to 0.1 micron.

DESCRIPTION OF THE PREFERRED EMBODIMENT

Figure 1:
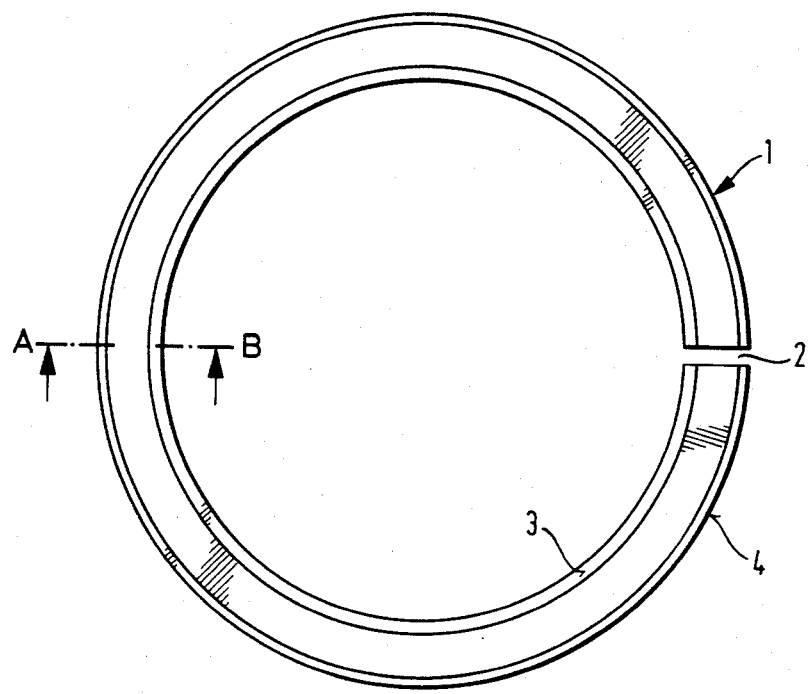
FIG. 1 is a plan view of an inventive piston ring.

Due to its uniform construction from a uniform and homogeneous material, the piston ring of the invention avoids the danger encountered with prior art piston rings, i.e., the chipping off of the coating. Because of the high heat resistance of the piston ring consisting of partially stabilized zirconium oxide, welding phenomenon with the piston ring groove does not occur. Another advantage which derives from the use of partially stabilized zirconium oxide resides in that this material does not tend to oxidize with residues formed from the combustion gases, as may be the case with metallic piston rings. But the decisive advantage of the present invention lies in the high mechanical wear resistance of the piston ring obtained by sintering and consisting of partially stabilized zirconium oxide. The high wear resistance is the more surprising since a piston ring of sintered partially stabilized zirconium oxide, while being harder than the known metallic piston rings, has a much lower hardness than, e.g., sintered silicon carbide.

Of major importance for the wear resistance of the piston ring of the present invention is the porosity of <3%, and preferably, less than 1.5%, which is extremely low compared with known piston rings. Only when this low porosity value is maintained, does the piston ring have a structural stability sufficient to produce the desired wear behavior.

It is understood that as used herein, partially stabilized zirconium oxide means a zirconium oxide which possesses a homogeneous structure and consists of grains present in the cubic modification in which tetragonal precipitations are present.

In a preferred form, the piston ring of the invention consists of a body produced by sintering of zirconium oxide which is partially stabilized with one or more oxides of magnesium, calcium, or yttrium, magnesium oxide being especially preferred, in a quantity of 2.7 to 3.2 wt.% based on the amount of zirconium oxide. In a zirconium oxide partially stabilized with magnesium oxide in this quantity, the strength and hence the wear resistance is at a maximum.

In another especially preferred form, the invention provides a piston ring which consists of a partially stabilized zirconium oxide wherein the proportion of the cubic modification does not exceed 80 weight percent, the proportion of the tetragonal modification being between 20 and 60 weight percent, and the proportion of the monoclinic modification being not greater than 6 weight percent, the proportion of the individual modifications making up 100 weight percent. The advantage of a piston ring consisting of such a partially stabilized zirconium oxide consists in an extremely high structure uniformity which avoids the breaking out of the individual grains and hence premature wear.

Although it is not yet fully understood to what the excellent properties of the inventive piston ring may be attributed, it may be that the high strength of the partially stabilized zirconium oxide, measured as the ultimate strength $\sigma_B$, is responsible for this. Therefore, a partially stabilized zirconium oxide which has a bending strength of at least 400 MPa, must be regarded as especially suitable for the present invention.

The piston ring of the present invention has a high hardness of at least $1.2 \times 10^4 N/mm^2$ measured as Vickers hardness (Hv). As a result, in the running of an internal combustion engine, the actual running-in process between cylinder liner and piston ring takes place almost exclusively at the cylinder liner. The homogenous composition of the piston ring of the invention and its uniform microstructure avoids the danger of irregular wearing of the two friction partners, i.e., the cylinder wall and piston ring, occurring. Also, the piston ring of the invention does not require the known precautionary measure of providing a coating on the piston ring for the running-in process which can rub off fast.

Another advantage of the piston ring of the invention is that it weighs 20% less than a steel ring.

Figure 2:
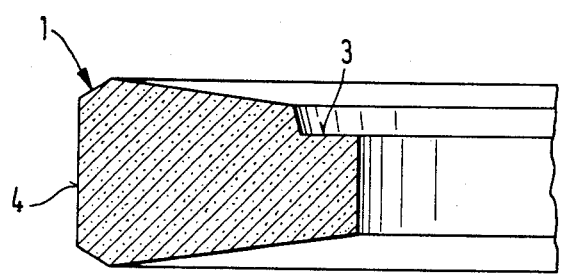
FIG. 2 is a cross-section along the line A–B of FIG. 1.

FIGS. 1 and 2 show a preferred form of the piston ring of the invention. FIG. 1 shows a plan view of piston ring 1 of a zirconium oxide partially stabilized with 2.9 wt.% magnesium oxide, having a porosity of 1.4% and a centerline average roughness $R_a$ of 0.09 μm. The piston ring has a slit 2. FIG. 2 shows in enlarged scale, a section along line A-B of FIG. 1. By an inner bevel 3, the rolling surface 4 coming in contact with the cylinder running track (not shown) develops in a conical form during operation.

We claim:

1. A piston ring for an internal combustion engine made of ceramic materials comprising a piston ring (1) consisting of a body from partially stabilized zirconium oxide (PSZ) made by sintering which has a porosity of less than 3%, and a proportion of the cubic modification not exceeding 80 wt.%, a proportion of the tetragonal modification between 20 and 60 wt.%, and a proportion of the monoclinic modification not greater than 6 wt.%, the proportions of the individual modifications making up 100 wt.%, and wherein the rolling surface (4) of piston ring (1) has a centerline average roughness $R_a$ of 0.03 to 0.1 μm.

2. The piston ring of claim 9 wherein the zirconium oxide is partially stabilized with one or more oxides selected from the group consisting of magnesium, calcium oxide, and yttrium oxide.

3. The piston ring of claim 2 wherein the partially stabilized zirconium oxide has a proportion of the cubic modification not exceeding 80 wt.%, a proportion of the tetragonal modification between 20 and 60 wt.%, and a proportion of the monoclinic modification not greater than 6 wt.%, the proportions of the individual modifications making up 100 wt.%.

4. The piston ring of claim 3 wherein the bending strength $\sigma_B$ of the partially stabilized zirconium oxide is at least 400 MPa.

5. The piston ring of claim 2 wherein the bending strength $\sigma_B$ of the partially stabilized zirconium oxide is at least 400 MPa.

6. The piston ring of claim 1 wherein the bending strength $\sigma_B$ of the partially stabilized zirconium oxide is at least 400 MPa.

7. The piston ring of claim 9 wherein the bending strength $\sigma_B$ of the partially stabilized zirconium oxide is at least 400 MPa.

* * * * *